United States Patent [19]

Leverenz

[11] 4,250,089
[45] Feb. 10, 1981

[54] PROCESS FOR DIAZOTIZING AROMATIC AMINES

[75] Inventor: Klaus Leverenz, Leverkusen, Fed. Rep. of Germany

[73] Assignee: Bayer Aktiengesellschaft, Leverkusen, Fed. Rep. of Germany

[21] Appl. No.: 674,930

[22] Filed: Apr. 8, 1976

[30] Foreign Application Priority Data

Apr. 12, 1975 [DE]  Fed. Rep. of Germany ....... 2516032

[51] Int. Cl.$^3$ .................... C07C 113/04; C09B 29/08; C09B 29/26; C09B 29/18
[52] U.S. Cl. .................... 260/141; 260/156; 260/202; 260/204; 260/205; 260/206; 260/207; 260/207.1; 260/207.5
[58] Field of Search ............ 260/141 P, 141 R, 141 H

[56] References Cited

U.S. PATENT DOCUMENTS

| 3,793,305 | 2/1974 | Balon | 260/141 |
| 3,888,841 | 6/1975 | Spietscha et al. | 260/141 |

FOREIGN PATENT DOCUMENTS

| 2256171 | 6/1974 | Fed. Rep. of Germany | 260/141 |
| 45-40185 | 12/1970 | Japan | 260/141 |

*Primary Examiner*—Floyd D. Higel
*Attorney, Agent, or Firm*—Sprung, Felfe, Horn, Lynch & Kramer

[57] ABSTRACT

The invention relates to a process for diazotizing aromatic amines which are not diazotizable, or only incompletely diazotizable, in aqueous media containing mineral acid. It is characterized in that the diazotization is effected by means of nitrosyl compounds in organic, dipolar, aprotic solvents which do not undergo a chemical reaction with the diazonium salts of the aromatic amines. The new process is distinguished by less contamination of the effluent.

5 Claims, No Drawings

PROCESS FOR DIAZOTIZING AROMATIC AMINES

This invention relates to a process for diazotising aromatic amines which are not diazotisable, or only incompletely diazotisable, in aqueous media containing mineral acid, which is characterised in that the diazotisation is effected by means of nitrosyl compounds in organic, dipolar, aprotic solvents which do not undergo a chemical reaction with the diazonium salts of the aromatic amines.

Suitable amines which can be diazotised in accordance with the process of the invention are weakly basic aromatic-carbocyclic compounds of the formula

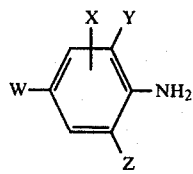
(I)

wherein

W is a non-ionic substituent customary in azo chemistry and having a Hammett constant $\sigma(para) > +0.5$ or an arylazo group and X, Y and Z are hydrogen or any desired non-ionic substituents customary in azo chemistry, with the proviso that the sum of the $\sigma(meta)$-values of X, Y and Z is $> +0.5$.

The Hammet constant $\sigma$ is defined in more detail in Chem. Reviews 53, 191 (1953).

Examples of suitable substituents W are $NO_2$, $CN$, $SO_2CH_3$, $COOC_2H_5$, $SCN$ and

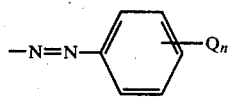

wherein

Q denotes Cl, Br, $CH_3$, $OCH_3$, $OC_2H_5$, $NO_2$ and CN and n denotes 0–3.

Amines to be employed preferentially correspond to the formula

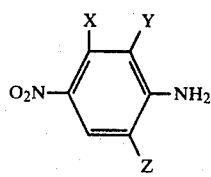
(II)

wherein

X, Y and Z have the abovementioned meaning.

Suitable non-ionic substituents are those mentioned in the formulae which follow.

Amines to be used particularly preferentially correspond to the formula

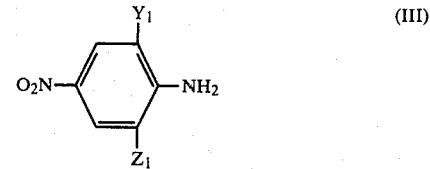
(III)

wherein $Y_1$ represents F, Cl, Br, I, $CF_3$, CN, $SO_2CH_3$, $SO_2C_2H_5$, $COCH_3$, $CO_2CH_3$, $CO_2C_2H_5$, $NO_2$,

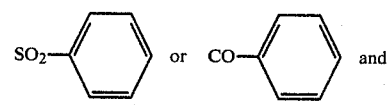

and $Z_1$ represents hydrogen, F, Cl, Br, I, $CF_3$, CN or $NO_2$, with the proviso that the sum of the $\sigma_{meta}$-values of $Y_1$ and $Z_1$ is $> +0.5$;

amongst these, in turn, preferred amines are those which correspond to the formula

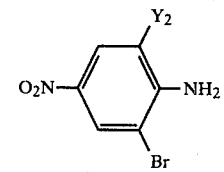
(IV)

wherein $Y_2$ represents Cl, Br, $CF_3$, CN, $SO_2CH_3$ or $NO_2$.

Further suitable amines are hetero-aromatic amines of the benzthiazole and thiadiazole series.

The following amines may be mentioned by way of examples: 2,4-dinitro-aniline, 6-bromo-2,4-dinitro-aniline, 6-chloro-2,4-dinitro-aniline, 5-nitro-2-aminobenzonitrile, 5-nitro-3-chloro-(or bromo)-2-amino-benzonitrile, 3,5-dinitro-2-amino-benzonitrile, 2,6-dichloro-4-nitro-aniline, 2,6-dibromo-4-nitro-aniline, 2-bromo-6-chloro-4-nitro-aniline, 2,4-dicyano-aniline, (3-bromo-5-chloro-4-aminophenyl)-methylsulphone, (5-nitro-2-aminophenyl)-methylsulphone, (5-nitro-3-bromo-2-amino-phenyl)-methylsulphone, 5-nitro-2-amino-benzotrifluoride, 5-nitro-3-bromo-2-amino-benzotrifluoride, 2,4-dinitro-1-amino-naphthalene, 3-phenyl-5-amino-1,2,4-thiadiazole, 2-amino-5-phenyl-1,3,4-thiadiozole, 2-amino-5-nitrothiazole, 2-amino-6-nitro-benzthiazole, 3,5-dibromo-4-amino-benzoic acid ethyl ester, 3,5-dibromo-4-amino-acetophenone and (3-nitro-4-aminophenyl)-ethyl-sulphone.

The nature of the solvents to be used according to the invention depends on the nature of the diazonium salts of the aromatic amines.

The suitability of a solvent can in each individual case easily be determined by a simple small-scale experiment. In this, the diazonium salt should still be detectable in the particular diazotisation batch after standing for not less than 24 hours at 0° C.

Water-miscible solvents are preferred.

Examples of suitable easily accessible solvents are acetonitrile, propionitrile, β-hydroxypropionitrile, β-methoxypropionitrile and—in particular—tetrahydrothiophene-1,1-dioxide and its derivatives, above all the 2-methyl, 3-methyl and 2,5-dimethyl derivative.

Unsubstituted tetrahydrothiophene-1,1-dioxide is very particularly preferred.

These solvents can be employed undiluted or can—say in order to lower the freezing point—contain up to about 1 mol (relative to the amine) of a lower fatty acid, for example formic acid, acetic acid and/or propionic acid.

The amount of the solvent should be so chosen as to produce a system which can be stirred readily. In general, from 1.5 to twice the amount of weight (relative to the amine) suffices for this purpose. There are virtually no upper limits.

Nitrosyl compounds which can be used are esters of nitrous acid with alcohols in the presence of mineral acid, nitrosyl chloride and above all nitrosylsulphuric acid, and normally the amount used for these is equivalent to the amine.

The reaction temperatures are −20° to 30° C., preferably −5° to 10° C., that is to say around zero.

The reaction times vary between 1 and 24 hours depending on the type of amine, the reaction temperature, the size of the batch and other factors.

It must be described as distinctly surprising that the weakly basic amines to be used according to the invention can be diazotised so smoothly under the conditions mentioned, since it has been found that in the presence of aprotic solvents usually employed, for example formamide and dimethylformamide (compare Houben-Weyl, Volume X/3, page 31), rapid decomposition of the diazonium salts of the amines of the formulae I-II occurs.

Compared to the conventional industrial diazotisation of weakly basic amines in anhydrous mineral acids or carboxylic acids, the new process exhibits a number of advantages.

For example, the coupling reaction which usually follows can also be carried out very advantageously in an organic solvent. Since the solvent can easily be recovered by distillation, substantially less contamination of the effluent results.

Furthermore it is possible to carry out, without any intermediate isolation, secondary reactions which are customary in this field, such as replacement of a halogen atom in the ortho-position to the azo bridge by a cyano, nitro or sulphone group (compare British Pat. Nos. 1,125,683, 1,226,950 and 1,255,367) in the reaction medium wherein the diazotisation or coupling has been carried out, after—if necessary—having neutralised beforehand the acid introduced by the nitrosylating agent, which only requires small amounts of base because of the comparatively rather low amount of acid.

The process according to the invention permits the preparation of azo dyestuffs in high yields and high purity and is, in this respect also, frequently superior to known methods. In addition, the solutions and dispersions of the diazonium salts obtained in accordance with the new process are suitable for carrying out the known Sandmeyer reaction. Here again, the effluent problems which arise are comparatively slight.

The preferred method of diazotisation of negatively substituted 4-nitro-anilines in tetrahydrothiophene-1,1-dioxide with nitrosylsulphuric acid in addition is distinguished by being advantageous from the point of view of technical safety.

The examples which follow are intended to explain the new process in more detail.

EXAMPLE 1

37.5 g of 6-bromo-2,4-dinitro-aniline are stirred with 85 ml of tetrahydrothiophene-1,1-dioxide, with the addition of 5.5 ml of formic acid. Starting at +10° C., 25 ml of 45% strength nitrosylsulphuric acid are added in the course of about 45 minutes, whilst at the same time cooling to −10° C. The mixture is then stirred for a further two hours at −10° to −5° C. The solution of the diazonium salt which has been obtained at this stage can be employed for the preparation of azo dyestuffs in accordance with a process which is in itself known; for example, the above solution is added, at maximally 0° C., to a mixture of 42 g of N-ethyl-N-β-cyanoethyl-2-methoxy-5-acetamino-aniline, 26 g of magnesium oxide and 500 ml of methanol, with vigorous stirring. After two hours, the blue dyestuff produced, of the formula

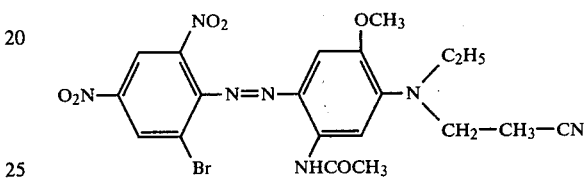

is filtered off and washed first with methanol and then with water. The quality of the dyestuff, which dyes polyester fibres in navy blue shades, is at least equivalent to that of a dyestuff prepared in a conventional manner, for example in glacial acetic acid.

If, in Example 1, in place of 6-bromo-2,4-dinitro-aniline the equivalent amount of 6-chloro-2,4-dinitro-aniline is used, a dyestuff of similar quality is obtained.

EXAMPLE 2

12.8 g of 2,6-dibromo-4-nitro-aniline are stirred with 50 ml of 3-hydroxypropionitrile. 7.5 ml of 45% strength nitrosylsulphuric acid are added dropwise at 5°-10° C. and the mixture is stirred for a further 15 hours at 20°-25° C. A solution of the 2,6-dibromo-4-nitro-aniline-diazonium salt is obtained; this can, for example, be employed as follows for the coupling reaction:

9.5 g of N,N-bis-β-hydroxyethyl-3-chloroaniline are dissolved in 200 ml of methanol. The above diazotisation mixture is added to this solution at 0°-10° C. The brown dyestuff which has precipitated, of the formula

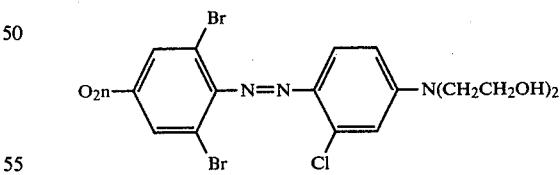

is isolated as in Example 1. It dyes polyester materials in brown shades.

Dyestuffs with similar properties are obtained if, in Example 2, the 2,6-dibromo-4-nitro-aniline is replaced by equivalent amounts of 2,6-dichloro-4-nitro-aniline or 2-bromo-6-chloro-4-nitro-aniline.

EXAMPLE 3

7.5 ml of 45% strength nitrosylsulphuric acid are added to 7.4 g of 5-nitro-2-amino-benzonitrile in 25 ml of tetrahydrothiophene-1,1-dioxide at 10° to 0° C. After 5 hours at about 0° C., a solution of the diazonium salt has been obtained, and this is added to a solution of 8.5 g of N-ethyl-N-(β-cyanoethyl)-aniline in 250 ml of methanol at 0°–5° C. The resulting dyestuff, of the formula

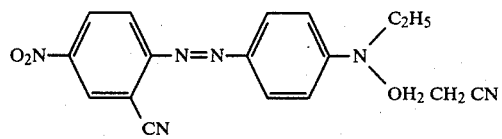

dyes polyester fibres in ruby-red shades.

EXAMPLE 4

25 ml of 45% strength nitrosylsulphuric acid are added to 21.4 g of (5-nitro-3-bromo-2-amino-phenyl)-methylsulphone in 100 ml of tetrahydrothiophene-1,1-dioxide at 10° to 0° C. and the mixture is then stirred for 4 hours at about 0° C. This diazonium salt solution is added, at 0°–5° C., to a mixture of 21 g of 3-diethylamino-acetanilide, 13 g of magnesium oxide and 500 ml of methanol, whilst stirring. The red-violet azo dyestuff of the formula

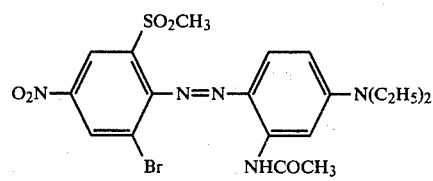

is obtained in very good yield.

EXAMPLE 5

89.5 g of 2,6-dibromo-4-nitro-aniline are dissolved in 170 ml of hot tetrahydrothiophene-1,1-dioxide. After cooling with rapid stirring, 50 ml of 45% strength nitrosylsulphuric acid are added to the suspension obtained, at 15°–20° C., and the mixture is then stirred for 2 hours at this temperature. The solution of the diazonium salt is added, at about 0° C., to a solution of 140 g of sodium 2-methoxy-aniline-ω-methanesulphonate and 80 g of sodium acetate in 1 l of ice/water. The dyestuff of the formula

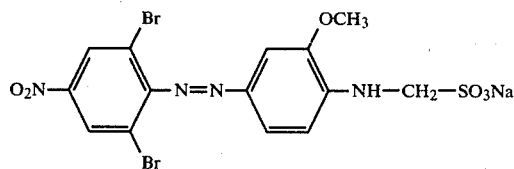

is obtained in very good yield.

EXAMPLE 6

25 ml of 45% strength nitrosylsulphuric acid are added to 38 g of 2-bromo-6-chloro-4-nitro-aniline in 85 ml of tetrahydrothiophene-1,1-dioxide at 5°–10° C. and the mixture is then stirred for 4 hours at −5° to 0° C. The solution of the diazonium salt is added, at about 0° C., to a solution of 48 g of (2-N-ethyl-N-phenylaminoethyl)-trimethylammonium methylsulphate in 1 l of ice water, and the dyestuff of the formula

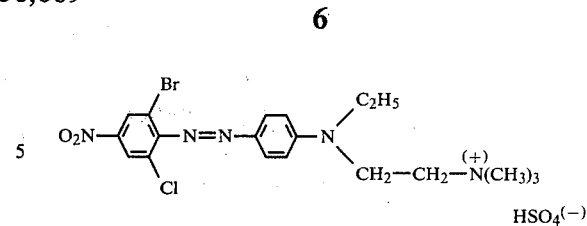

is then precipitated by adding sodium sulphate. It dyes polyacrylonitrile fibres in yellow-brown shades.

EXAMPLE 7

27 g of 2,4-dinitroaniline in 100 ml of tetrahydrothiophene-1,1-dioxide are diazotised with 25 ml of 45% strength nitrosylsulphuric acid at 5°–10° C. over the course of 5 hours. The diazonium salt solution is added, at 0°–5° C. and pH 4–5, to a suspension of 47 g of 3-hydroxy-2-naphthoic acid 2′-ethoxy-anilide.

The resulting dyestuff of the formula

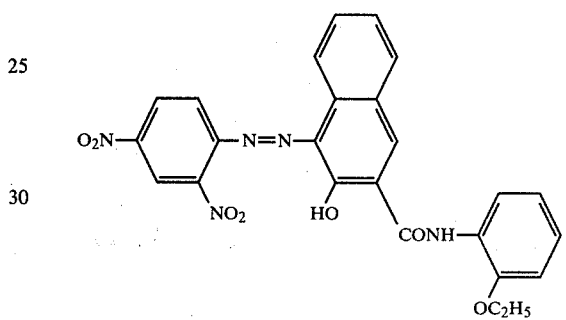

dyes plastics and lacquers in brilliant red shades.

EXAMPLE 8

25 ml of 96% strength sulphuric acid are added to 32 g of (5-nitro-2-amino-phenyl)-methylsulphone in 200 ml of tetrahydrothiophene-1,1-dioxide. 21.5 ml of isoamyl nitrite are added dropwise to the mixture at −10° to −5° C. and the mixture is stirred for a further 5 hours at this temperature. The solution of the diazonium salt is added at 0°–5° C. to a solution of 26 g of N-ethyl-N-β-cyanoethyl-aniline in 500 ml of methanol. The resulting dyestuff of the formula

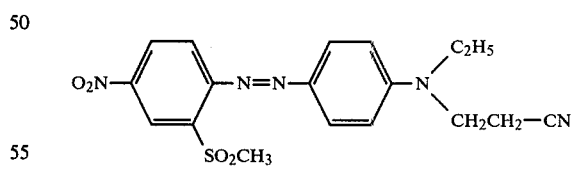

dyes polyester fibres in red shades.

EXAMPLE 9

21 g of 2,4-dicyano-aniline in 100 ml of tetrahydrothiophene-1,1-dioxide are diazotised with 25 ml of 45% strength nitrosylsulphuric acid over the course of 4 hours at 5°–10° C. The solution of the diazonium salt is added, at 0°–5° C., to a solution of 23 g of potassium hydroxide and 30 g of 1-methyl-4,6-dihydroxy-2-pyridone-3-carboxylic acid methylamide. The resulting dyestuff, of the formula

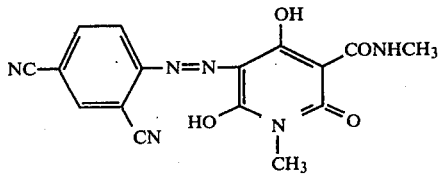

dyes polyester fibres in clear yellow shades.

I claim:

1. In a process for diazotizing an aromatic amine which is not diazotizable or is only incompletely diazotizable in aqueous media containing mineral acid to produce the corresponding diazonium salt of said aromatic amine, the improvement comprising diazotizing an amine of the formula:

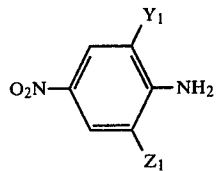

wherein $Y_1$ represents F, Cl, Br, I, $CF_3$, CN, $SO_2CH_3$, $SO_2C_2H_5$, $COCH_3$, $CO_2CH_3$, $CO_2C_2H_5$, $NO_2$,

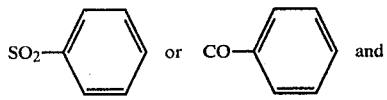

$Z_1$ represents hydrogen, F, Cl, Br, I, $CF_3$, CN or $NO_2$, with the proviso that the sum of the σ-meta-values of $Y_1$ and $Z_1$ is $> +0.5$, in a solvent selected from the group consisting of a lower fatty acid nitrile, tetrahydrothiophene-1,1-dioxide, 2-methyltetrahydrothiophene-1,1-dioxide, 3-methyltetrahydrothiophene-1,1-dioxide and 2,5-dimethyl-tetrahydrothiophene-1,1-dioxide by means of a nitrosyl compound selected from the group consisting of nitrosyl chloride, nitrosyl sulfuric acid, and esters of nitrous acid with alcohols in the presence of mineral acid at from −20° C. to 30° C. until the diazotization is completed.

2. The process of claim 1, wherein said amine has the formula:

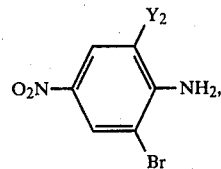

wherein
$Y_2$ represents Cl, Br, $CF_3$, CN, $SO_2CH_3$ or $NO_2$.

3. The process of claim 1, wherein said solvent is acetonitrile, propionitrile, β-hydroxypropionitrile, β-methoxypropionitrile, tetrahydrothiophene-1,1-dioxide, 2-methyl-tetrahydrothiophene-1,1-dioxide, 3-methyl-tetrahydrothiophene-1,1-dioxide, or 2,5-dimethyl-tetrahydrothiophene-1,1-dioxide.

4. The process of claim 3, wherein said solvent is tetrahydrothiophene-1,1-dioxide and said nitrosyl compound is nitrosyl sulfuric acid.

5. The process of claim 2 wherein said solvent is tetrahydrothiophene-1,1-dioxide and said nitrosyl compound is nitrosyl sulfuric acid.

* * * * *